(12) United States Patent
Barkman et al.

(10) Patent No.: US 11,169,604 B2
(45) Date of Patent: Nov. 9, 2021

(54) DETERMINATION OF GAZE CALIBRATION PARAMETERS

(71) Applicant: Tobii AB, Danderyd (SE)

(72) Inventors: Patrik Barkman, Danderyd (SE); David Molin, Danderyd (SE)

(73) Assignee: Tobii AB, Danderyd (SE)

(*) Notice: Subject to any disclaimer, the term of this patent is extended or adjusted under 35 U.S.C. 154(b) by 0 days.

(21) Appl. No.: 17/099,246

(22) Filed: Nov. 16, 2020

(65) Prior Publication Data

US 2021/0173477 A1  Jun. 10, 2021

(30) Foreign Application Priority Data

Nov. 15, 2019  (SE) ..................... 1951320-9

(51) Int. Cl.
  *G06F 3/01*  (2006.01)
  *G06K 9/00*  (2006.01)
(52) U.S. Cl.
  CPC ......... *G06F 3/013* (2013.01); *G06K 9/00604* (2013.01)
(58) Field of Classification Search
  CPC ... G06F 3/013; G06K 9/00604; G06T 1/0007; G06T 7/20; G06T 2207/20081; G06T 2207/30201
  See application file for complete search history.

(56) References Cited

U.S. PATENT DOCUMENTS 10,061,383 B1 * 8/2018 Ludusan ............... G06K 9/2018
10,379,612 B1    8/2019 Bonnier et al.
10,496,166 B2 * 12/2019 Kimura ................ A61B 3/0041
2014/0320397 A1 10/2014 Hennessey et al.
2015/0049013 A1  2/2015 Rahman
2015/0092983 A1  4/2015 Nguyen et al.
2015/0227197 A1  8/2015 Nomura et al.
2015/0316981 A1 11/2015 Sellen et al.
(Continued)

FOREIGN PATENT DOCUMENTS

CN   109240497    1/2019
DE   102013019117 5/2015
WO   2019154509   8/2019

OTHER PUBLICATIONS

Written Opinion of Swedish Patent Office regarding SE App. No. 1951320-9 dated Aug. 21, 2020.

*Primary Examiner* — Nelson M Rosario
(74) *Attorney, Agent, or Firm* — Samuel I. Yamron

(57) ABSTRACT

A method for determining gaze calibration parameters for gaze estimation of a viewer using an eye-tracking system. The method comprises obtaining a set of data points including gaze tracking data of the viewer and position information of at least one target visual; selecting a first subset of the data points and determining gaze calibration parameters using said first subset. A score for the gaze calibration parameters is determined by using the gaze calibration parameters with a second subset of data points, wherein at least one data point of the subset is not included in the first subset. The score is indicative of the capability of the gaze calibration parameters to reflect position information of the at least one target visual based on the gaze tracking data. The score is compared to a candidate score and if it is higher, the calibration parameters are set to the candidate calibration parameters and the score to the candidate score.

13 Claims, 4 Drawing Sheets

(56) References Cited

U.S. PATENT DOCUMENTS

| | | |
|---|---|---|
| 2015/0331485 A1 | 11/2015 | Wilairat et al. |
| 2016/0005176 A1 | 1/2016 | Nguyen et al. |
| 2017/0124391 A1 | 5/2017 | Invernizzi |
| 2018/0308252 A1* | 10/2018 | Alonso ................ G06F 3/0304 |

* cited by examiner

DETERMINATION OF GAZE CALIBRATION PARAMETERS

CROSS-REFERENCE TO RELATED APPLICATION

The present application claims benefit to Swedish patent application No., 1951320-9 filed on Nov. 15, 2019, to Barkman et al., entitled "DETERMINATION OF GAZE CALIBRATION PARAMETERS", and is hereby incorporated by reference in its entirety.

TECHNICAL FIELD

The present disclosure generally relates to eye-tracking and the determination of gaze calibration parameters. More specifically, the present disclosure relates to a method, a computing device, a computer program and a carrier for determining a set of gaze calibration parameters for gaze estimation of a viewer using an eye-tracking system.

BACKGROUND

User-apparatus interaction generally relates to the input of information to and control of a computing device (e.g. a computer, a tablet computer, a desktop computer, a handheld device such as a mobile telephone or similar) by a user. Many popular computer programs and operating systems have been developed to function primarily with input methods involving physical contact, e.g., by means of a mouse or keyboard. This type of physical input method is sometimes referred to as contact-required input method. It can be difficult for people who desire to use non-contact input methods to interact with these computer programs and operating systems. For example, some users must use non-contact input methods, e.g., because of an injury or disability.

As computer technology has evolved, non-contact input methods have been developed. Examples of such non-contact input systems are eye-tracking systems or gaze-tracking systems. The systems determine the direction of a user's gaze or the motion of the user's eye relative to the head and by using this information, it is possible for the user to input information and to control a computing device without involving physical contact. These systems can be used by a user that is viewing, for example, a desktop monitor, wearing a virtual reality (VR) headset or wearing an augmented reality (AR) headset.

In order for an eye-tracking system to perform well, calibration is generally required. This is due to the anatomical differences between users, but may also compensate for other variations that are not explicitly modeled in the eye-tracking system.

SUMMARY

It is in view of the above considerations and others that the various embodiments disclosed throughout this disclosure have been made.

A standard calibration procedure is carried out by requiring a user, or a viewer, of an eye-tracking system to look at objects whose location is known, e.g. stimuli points on a desktop monitor or dots in a virtual environment. There are many reasons why calibration of an eye-tracking system using such explicit calibration procedure may be undesirable. For example, such explicit calibration procedure may be undesirable as it reduces the feeling of seamlessness of the system and makes it intractable to continuously recalibrate the system if needed. Thus, a calibration where the calibration process is more smooth and seamless and where the viewer does not explicitly have to look at stimuli points is desirable. In addition to this, it is also important that the calibration process is robust to ambiguities in the environment.

In view of the above, it is therefore a general object of the embodiments of the present invention to improve upon existing methods and computing devices for calibration in eye-tracking systems.

This general object has been addressed by the appended independent claims. Advantageous embodiments are defined in the appended dependent claims.

In general terms, the present disclosure proposes calibration of an eye-tracking system without the user having to go through an explicit calibration procedure. This is performed by using information about the gaze of the viewer and information about content that may have the attention of the viewer to determine calibration parameters. Accordingly, from this information, the present disclosure determines the appropriate calibration for that specific situation and viewer.

According to a first aspect, a method for determining a set of gaze calibration parameters for gaze estimation of a viewer using an eye-tracking system is provided. The eye-tracking system is associated with a candidate set of gaze calibration parameters.

The method starts with the step of obtaining a set of data points at at least one point in time. The data points include gaze tracking data of the viewer and position information of at least one target visual that may attract the gaze of the viewer at said at least one point in time. The method further comprises selecting a first subset of said obtained set of data points and determining a set of gaze calibration parameters using said first subset of obtained set of data points. Thereafter the method continues with the step of determining a score for the determined set of gaze calibration parameters by using the set of gaze calibration parameters with a second subset of said obtained set of data points, wherein at least one of the data points in the second subset of data points is not included in the first subset of data points. The score is indicative of the capability of the set of gaze calibration parameters to reflect the position information of the at least one target visual based on the gaze tracking data. The method further comprises comparing the score for the set of gaze calibration parameters to a stored candidate score. If the score is higher than the stored candidate score, the method comprises setting the set of gaze calibration parameters to the candidate set of gaze calibration parameters and the score to the candidate score.

In some embodiments, the set of gaze calibration parameters minimize the sum of at least one offset value. Each offset value indicates an offset between each of the at least one target visual and a gaze estimation comprising at least one estimated gaze point. The gaze estimation is based on said gaze tracking data. In some of these embodiments, the step of determining a set of gaze calibration parameters may comprise optimizing a loss function, which determines the at least one offset value. The at least one offset may be determined by determining at least one estimated gaze point by inputting the obtained gaze tracking data and the candidate gaze calibration parameters into an eye-tracking algorithm. Thereafter, the method may comprise the step of determining at least one offset value between the at least one estimated gaze point and the position information of each of the at least one target visual.

In some embodiments, the offset value is a Euclidean distance between one of the at least one target visual and the gaze estimation in three dimensions. In other embodiments, the offset value is an angle between an estimated gaze direction, represented by a vector between an origin relative to the viewer and the gaze estimation, and a direction of the target visual, represented by a vector between the origin relative to the viewer and one of the at least one target visual.

In some embodiments, the score represents a number of inliers. An inlier is a data point having an offset value below a threshold. For example, if the number of inliers is the same for the score and the candidate score, the score is further based on the sum of the offset value of the inliers.

According to a second aspect, a computing device for determining a set of gaze calibration parameters for gaze estimation of a viewer using an eye-tracking system is provided. The eye-tracking system is associated with a candidate set of gaze calibration parameters.

The computing device comprises a processors and a memory. The memory comprises instructions executable by the processor whereby the computing device is operative to obtain a set of data points at at least one point in time. The data points include gaze tracking data of the viewer and position information of at least one target visual that may attract the gaze of the viewer at said at least one point in time. The computing device is further operative to select a first subset of said obtained set of data points and to determine a set of gaze calibration parameters using said first subset of obtained set of data points. The computing device is further operative to determine a score for the determined set of gaze calibration parameters by using the set of gaze calibration parameters with a second subset of said obtained set of data points, wherein at least one of the data points in the second subset of data points is not included in the first subset of data points. The score is indicative of the capability of the set of gaze calibration parameters to reflect the position information of the at least one target visual based on the gaze tracking data. The computing device is further operative to compare the score for the set of gaze calibration parameters to a stored candidate score. If the score is higher than the stored candidate score, the computing device is operative to set the set of gaze calibration parameters to the candidate set of gaze calibration parameters and the score to the candidate score.

In some embodiments, the set of gaze calibration parameters minimize the sum of at least one offset value. Each offset value indicates an offset between each of the at least one target visual and a gaze estimation comprising at least one estimated gaze point. The gaze estimation is based on said gaze tracking data. In some of these embodiments, the memory comprises instructions executable by the processor whereby the computing device is operative to determine a set of gaze calibration parameters by optimizing a loss function, which determines the at least one offset value. The computing device is operative to determine the at least one offset by determine at least one estimated gaze point by inputting the obtained gaze tracking data and the candidate gaze calibration parameters into an eye-tracking algorithm and to determine the at least one offset value between the at least one estimated gaze point and the position information of each of the at least one target visual.

In some embodiments, the offset value is a Euclidean distance between one of the at least one target visual and the gaze estimation in three dimensions. In other embodiments, the offset value is an angle between an estimated gaze direction, represented by a vector between an origin relative to the viewer and the gaze estimation, and a direction of the target visual, represented by a vector between the origin relative to the viewer and one of the at least one target visual.

In some embodiments, the score represents a number of inliers, wherein an inlier is a data point having an offset value below a threshold. For example, if the number of inliers is the same for the score and the candidate score, the first score is further based on the sum of the offset value of the inliers.

The computing device may be a computing device selected from the group consisting of: a computer (e.g. a Personal Computer (PC)), a tablet computer, and a desktop computer. Alternatively, the computing device may be a mobile telephone, a cellular phone, a smart phone or any other handheld electronic device.

According to a third aspect, a computer program is provided. The computer program comprises instructions which, when executed on at least one processor, cause the at least one processor to carry out the method according to the first aspect described herein.

A carrier containing the computer program according to the third aspect is also provided. The carrier may be one of an electronic signal, optical signal, radio signal, or computer readable storage medium.

Various embodiments described herein allow for an improvement upon existing methods and computing devices for calibrating an eye-tracking system. The various embodiments provide a solution for determining a set of gaze calibration parameters for gaze estimation of a viewer using an eye-tracking system such that an automatic calibration in the eye-tracking system can be provided. The present disclosure is robust to ambiguities in the information from the environment and finds the optimal values of the set of gaze calibration parameters for a specific viewer and situation.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those users skilled in the art. Like reference numbers refer to like elements or method steps throughout the description.

As described earlier, calibration is important for eye-tracking systems to perform well. Calibration is needed due to the anatomical differences between users, but may also compensate for other variations that are not explicitly modeled in the eye-tracking systems. Existing solutions for calibrating eye-tracking systems require a user to look at objects whose locations are known, which reduces the feeling of seamlessness of the systems. Furthermore, this makes it intractable to continuously recalibrate the system if needed.

It is therefore a general object of embodiments described herein to allow for an improved method and computing device for determining gaze calibration parameters, which may be used for gaze estimation of a viewer using an eye-tracking system.

In one of its aspects, the present disclosure presented herein concerns a method for determining a set of gaze calibration parameters for gaze estimation of a viewer using an eye-tracking system.

Figure 1:
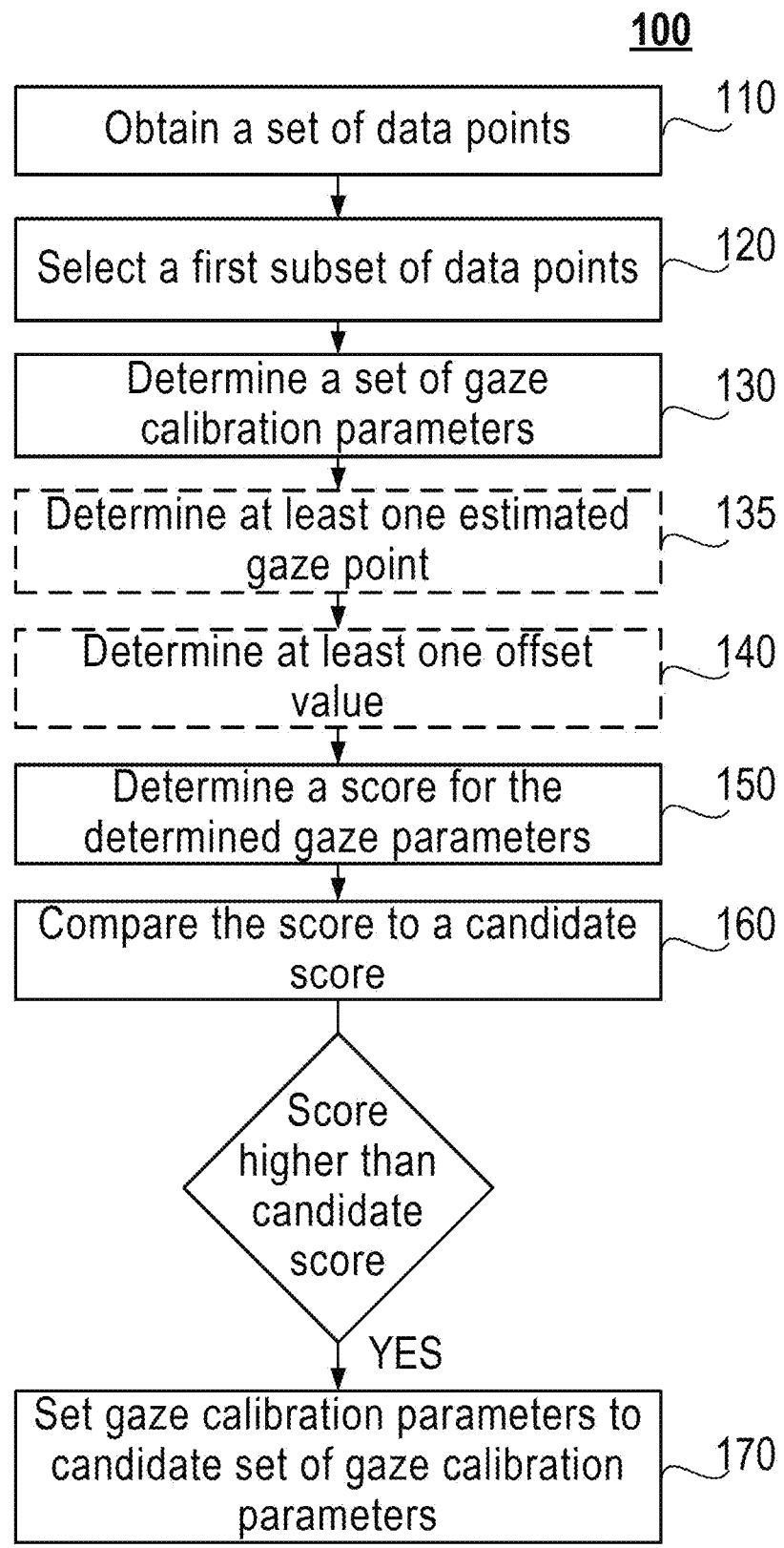
FIG. 1 illustrates a flowchart of a method according to an embodiment.

With reference to FIG. 1, a first embodiment will now be described. FIG. 1 illustrates a flowchart of a method 100 for determining a set of gaze calibration parameters for gaze estimation of a viewer using an eye-tracking system. The method 100 may be performed by a computing device, which may be equipped with an eye-tracking device, that is capable of collecting enough data for calibrating a corresponding eye-tracking device. The method 100 can generally be described as comprising two basic phases: data collection and calibration.

The method 100 starts with the data collection phase. The data collection phase comprises step 110 of the method 100. Step 110 comprises obtaining a set of data points at at least one point in time. The obtained set of data points is collected to be used for the calibration of the eye-tracking system. The data points are obtained at at least one point in time, but preferably, data points are obtained over a time period at possibly regular time steps, e.g. 1 second intervals. Data points may, for example, be obtained for a predetermined number of time steps. For each time step, two types of data are obtained. These two types are gaze tracking data of the viewer and position information of at least one target visual that may attract the gaze of the viewer at said at least one point in time. Thus, the obtained data points include gaze tracking data of the viewer and position information of at least one target visual that may attract the gaze of the viewer at said at least one point in time.

The gaze tracking data may be, for example, raw sensor data, i.e. raw images of the person or the eyes of the person. Alternatively, the gaze tracking data may be features extracted from the raw sensor information, i.e. position of the cornea or pupil. If the gaze tracking data is features extracted from the raw sensor information, it has to be noted that it is of importance that the computing device should be able to still use these features for calibrating the eye-tracking system at a later time. The benefit of only collecting features derived from the raw data may be that less memory may be used. Further, computational time may be reduced, due to avoidance of repeating calculations.

The position information of at least one target visual that may attract the gaze of the viewer may be, for example, x, y and z coordinates of the at least one target visual. The target visual may be an object or a region that the viewer is likely to look at, i.e. an object or region that has a high probability of having the attention of the viewer. These target visuals may be estimated through heuristic algorithms, e.g. selecting moving objects in a game or high contrast regions in a movie. Alternatively, these target visuals may be selected by more sophisticated machine learning methods that have been trained to learn the mapping from content to target visuals. For each time step, the position information of at least one target visual is obtained. In some embodiments, position information of several target visuals may be obtained for each time step.

The position information of the at least one target visual may be obtained in several different ways. For example, for a desktop monitor or VR headset this can be done by reading what is shown on their corresponding displays. Alternatively, the process that decides what to show on the displays may be intercepted, e.g. by having access to the interface of a game which is shown on the displays. Alternatively, only content where prior information of what the content contains may be shown on the display. Similarly, this may also be applied for virtual objects in AR with the addition of information about what is seen in the real world from cameras mounted on the headset, e.g. red, green and blue (RGB) and depth cameras.

Figure 2:
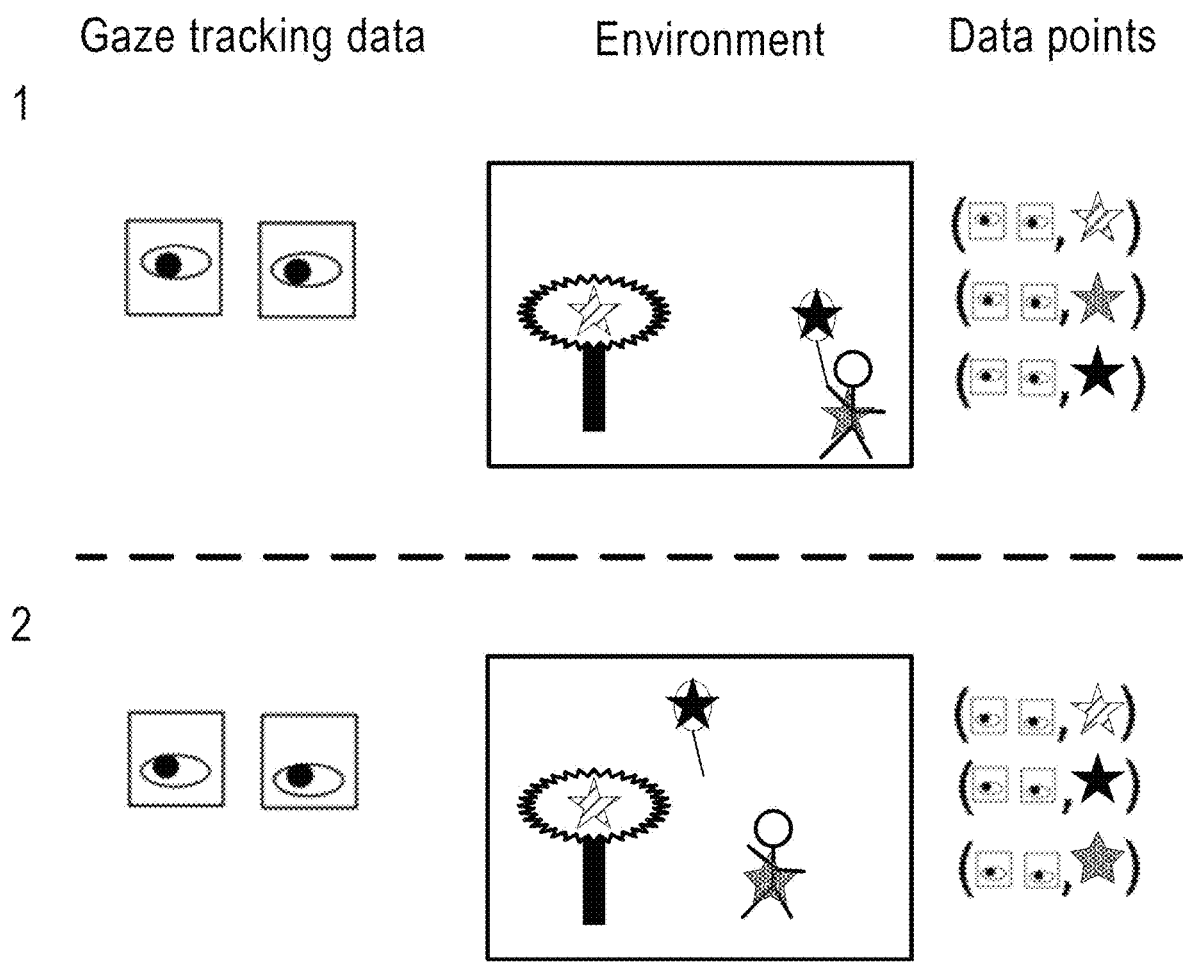
FIG. 2 illustrates an example of data collection at two time steps.

Accordingly, at at least one point in time, i.e. at least one time step, gaze tracking data of the viewer and position information of at least one target visual are obtained. Each position information of a target visual along with the gaze tracking data from the same time step form a pair which are referred to as a data point. Thus, from one time step several data points may be obtained, i.e. a set of data points. FIG. 2 illustrates an example of two sets of data points collected at two time steps, time step 1 and time step 2. The numbers 1 and 2 illustrate which time step it is. Above the dashed line is time step 1, below the dashed line is time step 2. The first column illustrates the gaze tracking data. In FIG. 2, the gaze tracking data is images of the eyes of the user, i.e. the viewer. The second column shows an illustration of the environment the user is viewing, i.e. a tree, a person and a balloon. Location of target visuals have been identified and marked with stars. These objects are thus likely to attract the gaze of the viewer at said time steps. The third column shows the obtained data point, as seen in the figure there is one for each target visual. Thus, if data points are obtained for more than one point in time, a big set of data points that come from different time steps may have been obtained.

The obtained set of data points may contain inherently ambiguous information for calibrating an eye-tracking system. For example, it is not possible to look at multiple target visuals simultaneously, yet many data points from the same time step may have been stored. This could be slightly redeemed by using an uncalibrated eye-tracking system to filter out very unlikely data points. However, if the uncalibrated system performs very poorly, or if there are many target visuals close to each other, then the ambiguity is unavoidable. Furthermore, the viewer may momentarily look away from e.g. the display causing none of the collected target visuals to be relevant. Thus, the next phase of the method 100 resorts to a calibration process that is robust against ambiguities in the data.

As described above, the next phase of method 100 is called the calibration phase. The obtained data points in the first phase are used in the calibration phase. As also seen in FIG. 1, this phase starts with that the method 100 continues with step 120 of selecting a first subset of said obtained set of data points. This first subset contains at least as many data points such that the eye-tracking system can be calibrated. The first subset may either be chosen randomly or in a more structured way. When the first subset is selected in a more structured way, this may be performed by only selecting one data point from each time step or by sampling data points closer to an uncalibrated gaze estimate more often.

Thereafter, the method 100 continues with step 130 of determining a set of gaze calibration parameters using the first subset of obtained set of data points. In some embodiments, the set of gaze calibration parameters may minimize the sum of at least one offset value. Each offset value may indicate an offset between each of the at least one target visual and a gaze estimation comprising at least one estimated gaze point. The gaze estimation is based on said gaze tracking data.

When the set of gaze calibration parameters minimize the sum of at least one offset value, step 130 of determining a set of gaze calibration parameters may further comprise optimizing a loss function. The loss function determines the at least one offset value. Thus, the loss function determines how well given values of the calibration parameters fit the first subset of data points. In these embodiments, the at least one offset is determined by performing step 130 of determining at least one estimated gaze point by inputting the obtained gaze tracking data and the candidate gaze calibration parameters into an eye-tracking algorithm. The method 100 may further comprise step 140 of determining the at least one offset value between the at least one estimated gaze point and the position information of each of the at least one target visual. In mathematical notation this may be written as $$L(p) = \sum_{(x,y) \in A} d(f(x, p), y)$$

where p are the calibration parameters, (x, y) a data point from the first subset A where x is the gaze tracking data and y the target visual position, f is the eye-tracking algorithm and d is a distance measure, which may correspond to an offset value.

Depending on the eye-tracking system, the quantities may take different forms. In the case of classical eye-tracking systems, i.e. glint based systems, f corresponds to the geometrical model of the eye and how glints are reflected of the cornea etc. p are parameters corresponding to fovea and optical axis offsets. For an appearance based system, f may correspond to a neural network and p (a subset of) its parameters.

The offset value, or distance measure d, may, for example, be a Euclidean distance between one of the at least one target visual and the gaze estimation in three dimensions. Alternatively, the offset value may be an angle between an estimated gaze direction, represented by a vector between an origin relative to the viewer and the gaze estimation, and a direction of the target visual, represented by a vector between the origin relative to the viewer and one of the at least one target visual. The origin may be, for example, an eye position or a position between the eyes of the viewer.

Thereafter, the values of the calibration parameters that minimize the loss function measured on the selected first subset may be determined. This may be performed by using an appropriate optimization algorithm. To be precise, the following minimization problem is solved $$p^* = \underset{p}{\operatorname{argmin}} L(p)$$

where p* is the optimal calibration parameters for this first subset of data points. p* is the output of this step of the method 100 and is to be used as input in the next step of the method.

In the next step 150, the method 100 determines a score for the determined set of gaze calibration parameters, e.g. p*. The score is determined by using the set of gaze calibration parameters with a second subset of said obtained set of data points. At least one of the data points in the second subset of data points is not included in the first subset of data points. Thus, the second subset of the set of data points is not identical to the first subset of the set of data points. In one example, some of the obtained data points included in the second subset of data points are also included in the first subset of data points. In another example, none of the obtained data points included in the second subset of data points is included in the first subset of data points. In a further example, the second subset of data points comprises all of the obtained data points of said obtained set of data points. That is, the second subset of data points may be equal to said obtained set of data points. The score is indicative of the capability of the set of gaze calibration parameters to reflect the position information of the at least one target visual based on the gaze tracking data. Thus, the optimal calibration parameters p* determined in step 130 of the method 100 are evaluated against at least some of the data points that are not included in the selected first subset of data points to see how well they perform calibration. As it is desirable that the evaluation is robust against ambiguities in the data, a score function similar to the loss function, which uses a score function with this property, may be used. Mathematically, the total score of p* may be expressed as $$S(p^*) = \sum_{(x,y) \in B} s(f(x, p^*), y)$$

where s is the score function and B the set of data points or the second subset of the set of data points. There may be several alternatives of score functions s. One alternative is to let s define if a data point is an inlier or not, i.e. the score may represent a number of inliers. An inlier is a data point having an offset value below a threshold. i.e.

$$s(f(x, p^*), y) = \begin{cases} 1 & \text{if } d(f(x, p^*), y) < \text{threshold} \\ 0 & \text{else} \end{cases}$$

The higher total score, the better the calibration parameters p* are considered to be.

Thereafter, the method 100 continues with step 160 of comparing the score for the set of gaze calibration parameters to a stored candidate score. If the score is higher than the stored candidate score, the method 100 continues to step 170 of setting the first set of gaze calibration parameters to the candidate set of gaze calibration parameters and the first score to the candidate score.

In one embodiment, when the method 100 is iterated for the first time, the set of calibration parameters p* determined in step 130 may be saved along with its corresponding score S(p*) as candidate set of calibration parameters and candidate score. These saved parameters may be denoted as the best calibration parameters: p_best and the corresponding score S_best. Then, in the next iteration of the method 100, S(p*) may be compared with the candidate score S_best and if S(p*)>S_best, then p* is set to p_best.

In the above described embodiment, where the score represents a number of inliers, the situation may arise where the number of inliers is the same for the score and the candidate score. In this scenario, the score may further be based on the sum of the offset value of the inliers, for example the inverse of the sum of the offset values.

According to the proposed method 100, the so far best model according to the chosen score function for determining the score for the set of gaze parameters is always maintained as the saved model. Thus, the provided method 100 makes it possible to find the optimal values of the set of gaze calibration parameters for a specific viewer and situation.

In some embodiments, the provided method 100 may be iterated a specified number of times. The candidate set of gaze calibration parameters, i.e. the set of gaze calibration parameters that are saved as p_best may be used for the eye-tracking system.

In some embodiments, the number of iterations of the method 100 may for some score functions be estimated given some requirement on the probability of finding the best possible calibration parameters given the collected data points. This may, for example, be done when using the inlier score function given an estimate on the number of inliers in the data. Otherwise, common practice may be to perform the method 100 for a specified number of iterations or until a set of calibration parameters with sufficiently high score function is found.

The provided method 100 has been presented as if the two phases, data collection and calibration, are carried out sequentially one after another and only once. However, in some embodiments, data points may be continuously collected and at regular intervals the calibration procedure on the newly collected data may be commenced. In such embodiments, the calibration parameters may be continuously updated.

The method 100 presented herein provides a way of determining a set of gaze calibration parameters for gaze estimation of a viewer using an eye-tracking system, which provides automatic calibration in eye-tracking systems. The method 100 is robust to ambiguities in the information from the environment and finds the optimal values of the set of gaze calibration parameters for a specific viewer and situation.

Figure 3:
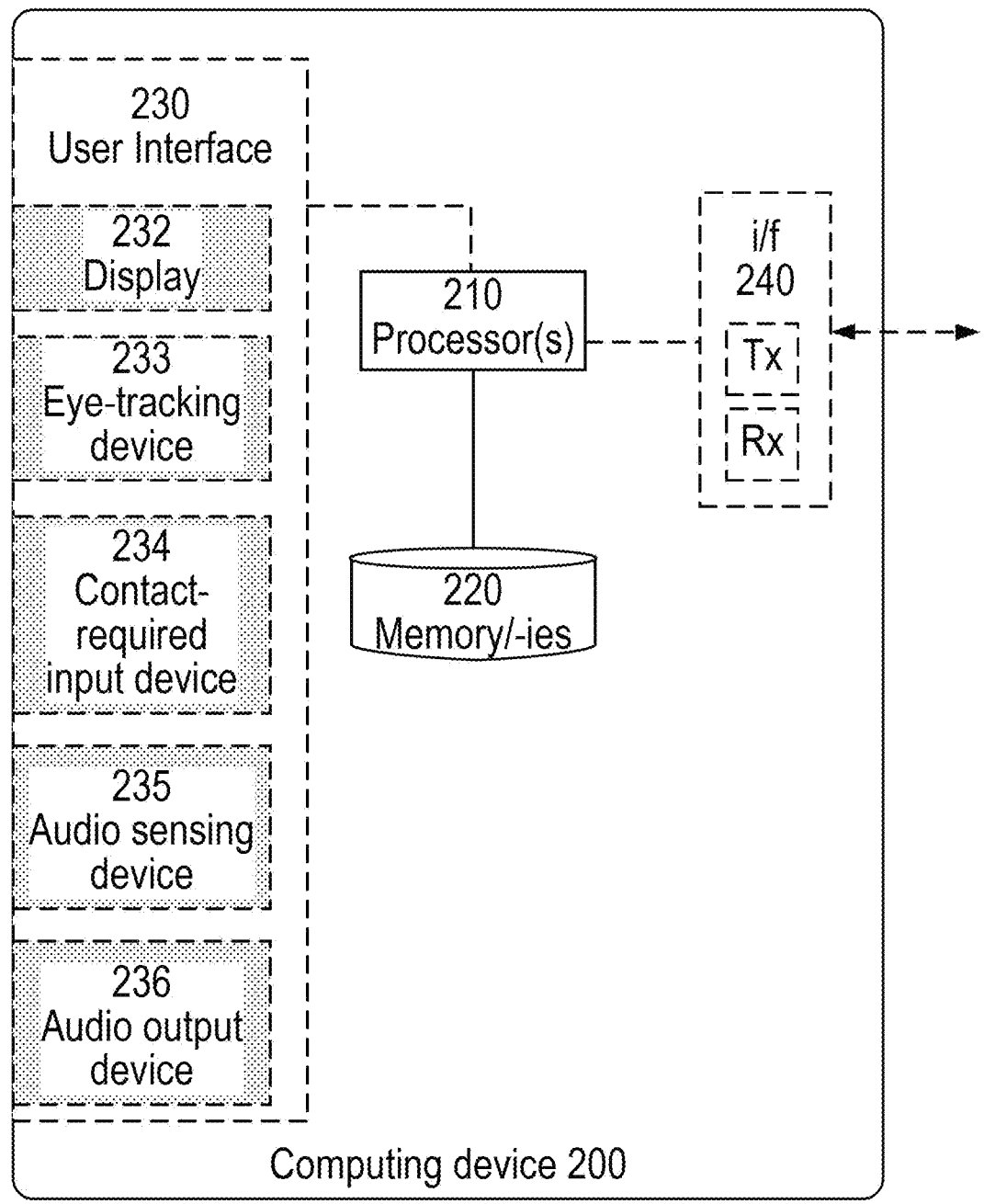
FIG. 3 illustrates an example implementation of a computing device according to an embodiment.

Reference is now made to FIG. 3, which illustrates an example implementation of an embodiment of a computing device 200. The computing device 200 may be embodied as an electronic apparatus, a computer (e.g. a Personal Computer (PC)), a tablet computer, a desktop computer, a mobile telephone, a cellular phone, a smart phone or a handheld electronic device.

The computing device 200 is configured to determine a set of gaze calibration parameters for gaze estimation of a viewer using an eye-tracking system. As can be seen in FIG. 3, the computing device 200 comprises one or more processor(s) 210 and one or more memories 220. Generally, the computing device 200 may also comprise a user interface (UI) 230. The UI 230 may include one or more of the following: a display 232, an eye-tracking device 233, a contact-required input device 234 (e.g. a physical input device), an audio sensing device 235, an audio output device 236. Also, a communications interface 240 may be provided in order to allow the computing device 200 to communicate with other apparatuses and/or servers (not shown), e.g. via a network such as the Internet. To this end, the communications interface 240 may comprise a transmitter (Tx) and a receiver (Rx). Alternatively, the communications interface 240 may comprise a transceiver (Tx/Rx) combining both transmission and reception capabilities. The communications interface 240 may include a radio frequency (RF) interface allowing the computing device 200 to communicate with other apparatuses and/or servers through a radio frequency band through the use of different radio frequency technologies such as 5G New Radio (5G NR), LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera.

The memory/-ies 220 comprises instructions executable by the processor(s) 210 whereby the computing device 200 is operative to obtain a set of data points at at least one point in time. The data points include gaze tracking data of the viewer and position information of at least one target visual that may attract the gaze of the viewer at said at least one point in time. The computing device 200 is further operative to select a first subset of said obtained set of data points and to determine a set of gaze calibration parameters using said first subset of obtained set of data points. The computing device 200 is further operative to determine a score for the determined set of gaze calibration parameters by using the set of gaze calibration parameters with a second subset of said obtained set of data points, wherein at least one of the data points in the second subset of data points is not included in the first subset of data points. The score is indicative of the capability of the set of gaze calibration parameters to reflect the position information of the at least one target visual based on the gaze tracking data. The computing device 200 is further operative to compare the score for the set of gaze calibration parameters to a stored candidate score and, if the first score is higher than the stored candidate score, to set the set of gaze calibration parameters to the candidate set of gaze calibration parameters and the score to the candidate score.

In some embodiments, the memory/-ies 220 may comprise instructions executable by the processor 210 whereby the computing device 200 is operative determine a first set of gaze calibration parameters by optimizing a loss function, which determines the at least one offset value. The computing device 200 may be operative to determine the at least one offset value by determine at least one estimated gaze point by inputting the obtained gaze tracking data and the candidate gaze calibration parameters into an eye-tracking algorithm. The computing device 200 may further be operative to determine the at least one offset value by determine the at least one offset value between the at least one estimated gaze point and the position information of each of the at least one target visual.

Figure 4:
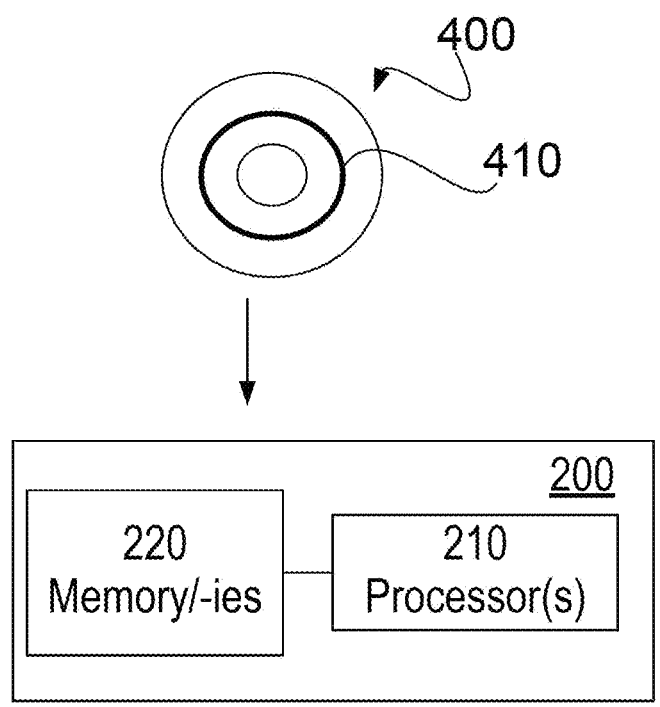
FIG. 4 illustrates a carrier containing a computer program, in accordance with an embodiment.

Turning now to FIG. 4, another embodiment will be briefly discussed. FIG. 4 shows an example of a computer-readable medium, in this example in the form of a data disc 400. In one embodiment, the data disc 400 is a magnetic data storage disc. The data disc 400 is configured to carry instructions 410 that can be loaded into one or more memories 220 of a computing device 200. Upon execution of said instructions by one or more processors 210 of the computing device 200, the computing device 200 is caused to execute a method or procedure according to any one of the embodiments disclosed in this disclosure. The data disc 400 is arranged to be connected to or within and read by a reading device (not shown), for loading the instructions into the processor(s). One such example of a reading device in combination with one (or several) data disc(s) 400 is a hard drive. It should be noted that the computer-readable medium can also be other mediums such as compact discs, digital video discs, flash memories or other memory technologies commonly used. In such an embodiment the data disc 400 is one type of a tangible computer-readable medium. The instructions may alternatively be downloaded to a computer data reading device, such as a computer or other computing device 200 capable of reading computer coded data on a computer-readable medium, by comprising the instructions in a computer-readable signal (not shown) which is transmitted via a wireless (or wired) interface (for example via the Internet) to the computer data reading device for loading the instructions into one or more processors 210 of the computing device 200. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method for determining a set of gaze calibration parameters for gaze estimation of a viewer using an eye-tracking system, wherein the eye-tracking system is associated with a candidate set of gaze calibration parameters, the method comprising: a) obtaining a set of data points at at least one point in time, wherein the data points include gaze tracking data of the viewer and position information of at least one target visual that may attract the gaze of the viewer at said at least one point in time; b) selecting a first subset of said obtained set of data points; c) determining a set of gaze calibration parameters using said first subset of obtained set of data points; d) determining a score for the determined set of gaze calibration parameters by using the set of gaze calibration parameters with a second subset of said obtained set of data points, w herein at least one of the data points in the second subset of data points is not included in the first subset of data points, wherein the score is indicative of the capability of the set of gaze calibration parameters to reflect the position information of the at least one target visual based on the gaze tracking data; e) comparing the score for the set of gaze calibration parameters to a stored candidate score; and f) if the score is higher than the stored candidate score, setting the set of gaze calibration parameters to the candidate set of gaze calibration parameters and the score to the candidate score, wherein the set of gaze calibration parameters minimize the sum of at least one offset value, wherein each offset value indicates an offset between each of the at least one target visual and a gaze estimation comprising at least one estimated gaze point, wherein the gaze estimation is based on said gaze tracking data.

2. The method according to claim 1, wherein the step of determining a set of gaze calibration parameters comprises optimizing a loss function which determines the at least one offset value, wherein the at least one offset is determined by: a) determining at least one estimated gaze point by inputting the obtained gaze tracking data and the candidate gaze calibration parameters into an eye-tracking algorithm; and b) determining the at least one offset value between the at least one estimated gaze point and the position information of each of the at least one target visual.

3. The method according to claim 1, wherein the offset value is a Euclidean distance between one of the at least one target visual and the gaze estimation in three dimensions.

4. The method according to claim 1, wherein the offset value is an angle between an estimated gaze direction, represented by a vector between an origin relative to the viewer and the gaze estimation, and a direction of the target visual, represented by a vector between the origin relative to the viewer and one of the at least one target visual.

5. The method according to claim 1, wherein the score represents a number of inliers, wherein an inlier is a data point having an offset value below a threshold.

6. The method according to claim 5, wherein, if the number of inliers is the same for the score and the candidate score, the score is further based on the sum of the offset value of the inliers.

7. A computing device for determining a set of gaze calibration parameters for gaze estimation of a viewer using an eye-tracking system, wherein the eye-tracking system is associated with a candidate set of gaze calibration parameters, the computing device comprising: a processor; and a memory comprising instructions executable by the processor whereby the computing device is operative to: a) obtain a set of data points at at least one point in time, wherein the data points include gaze tracking data of the viewer and position information of at least one target visual that may attract the gaze of the viewer at said at least one point in time; b) select a first subset of said obtained set of data points; c) determine a set of gaze calibration parameters using said first subset of obtained set of data points; d) determine a score for the determined set of gaze calibration parameters by using the set of gaze calibration parameters with a second subset of said obtained set of data points, wherein at least one of the data points in the second subset of data points is not included in the first subset of data points, wherein the score is indicative of the capability of the set of gaze calibration parameters to reflect the position information of the at least one target visual based on the gaze tracking data; e) compare the score for the set of gaze calibration parameters to a stored candidate score; and f) if the score is higher than the stored candidate score, set the set of gaze calibration parameters to the candidate set of gaze calibration parameters and the score to the candidate score, wherein the set of gaze calibration parameters minimize the sum of at least one offset value, wherein each offset value indicates an offset between each of the at least one target visual and a gaze estimation comprising at least one estimated gaze point, wherein the gaze estimation is based on said gaze tracking data.

8. The computing device according to claim 7, wherein the memory comprises instructions executable by the processor whereby the computing device is operative to determine a set of gaze calibration parameters by optimizing a loss function, which determines the at least one offset value, wherein the computing device is operative to determine the at least one offset by: a. determine at least one estimated gaze point by inputting the obtained gaze tracking data and the candidate gaze calibration parameters into an eye-tracking algorithm; and b. determine the at least one offset value between the at least one estimated gaze point and the position information of each of the at least one target visual.

9. The computing device according to claim 7, wherein the offset value is a Euclidean distance between one of the at least one target visual and the gaze estimation in three dimensions.

10. The computing device according to claim 7, wherein the offset value is an angle between an estimated gaze direction, represented by a vector between an origin relative to the viewer and the gaze estimation, and a direction of the target visual, represented by a vector between the origin relative to the viewer and one of the at least one target visual.

11. The computing device according to claim 8, wherein the score represents a number of inliers, wherein an inlier is a data point having an offset value below a threshold.

12. The computing device according to claim 11, wherein if the number of inliers is the same for the score and the candidate score, the first score is further based on the sum of the offset value of the inliers.

13. A non-transitory computer readable storage medium comprising a computer program, the computer program comprising instructions which when executed on at least one processor, cause the at least one processor to carry out the method comprising: a) obtaining a set of data points at at least one point in time, wherein the data points include gaze tracking data of the viewer and position information of at least one target visual that may attract the gaze of the viewer at said at least one point in time; b) selecting a first subset of said obtained set of data points; c) determining a set of gaze calibration parameters using said first subset of obtained set of data points; d) determining a score for the determined set of gaze calibration parameters by using the set of gaze calibration parameters with a second subset of said obtained set of data points, wherein at least one of the data points in the second subset of data points is not included in the first subset of data points, wherein the score is indicative of the capability of the set of gaze calibration parameters to reflect the position information of the at least one target visual based on the gaze tracking data; e) comparing the score for the set of gaze calibration parameters to a stored candidate score; and f) if the score is higher than the stored candidate score, setting the set of gaze calibration parameters to the candidate set of gaze calibration parameters and the score to the candidate score, wherein the set of gaze calibration parameters minimize the sum of at least one offset value, wherein each offset value indicates an offset between each of the at least one target visual and a gaze estimation comprising at least one estimated gaze point, wherein the gaze estimation is based on said gaze tracking data.

* * * * *